O. H. BARTHOLOMEW.
COLLAPSIBLE RIM.
APPLICATION FILED NOV. 12, 1919.
1,372,794.
Patented Mar. 29, 1921.
2 SHEETS—SHEET 1.
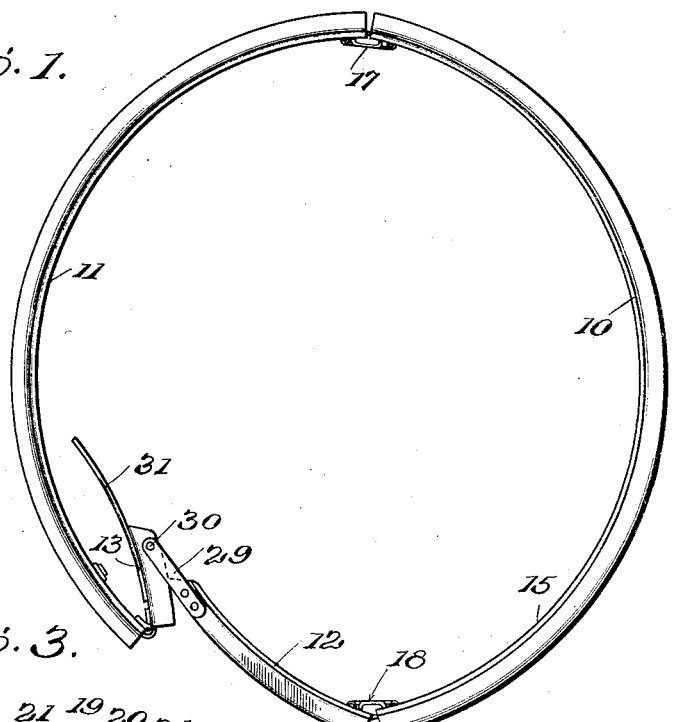
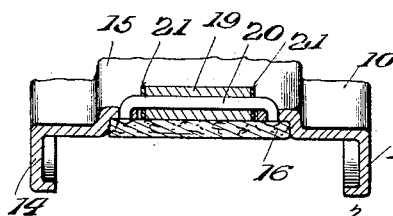
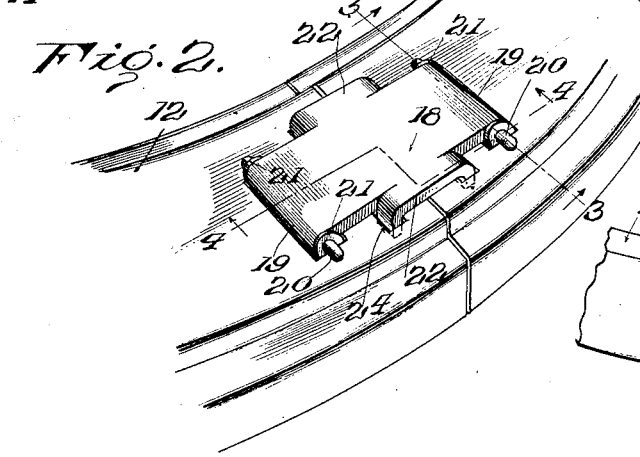
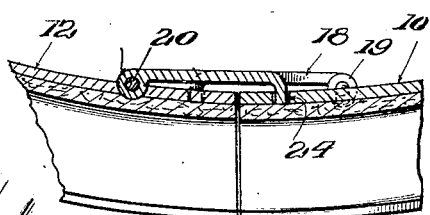
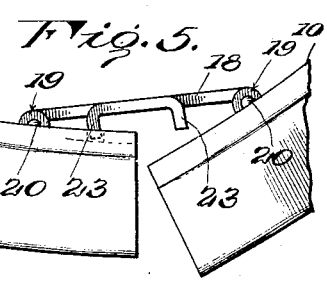
Inventor.
Ohmer H. Bartholomew
by Lacey & Lacey his Att'ys O. H. BARTHOLOMEW.
COLLAPSIBLE RIM.
APPLICATION FILED NOV. 12, 1919.
1,372,794.
Patented Mar. 29, 1921.
2 SHEETS—SHEET 2.
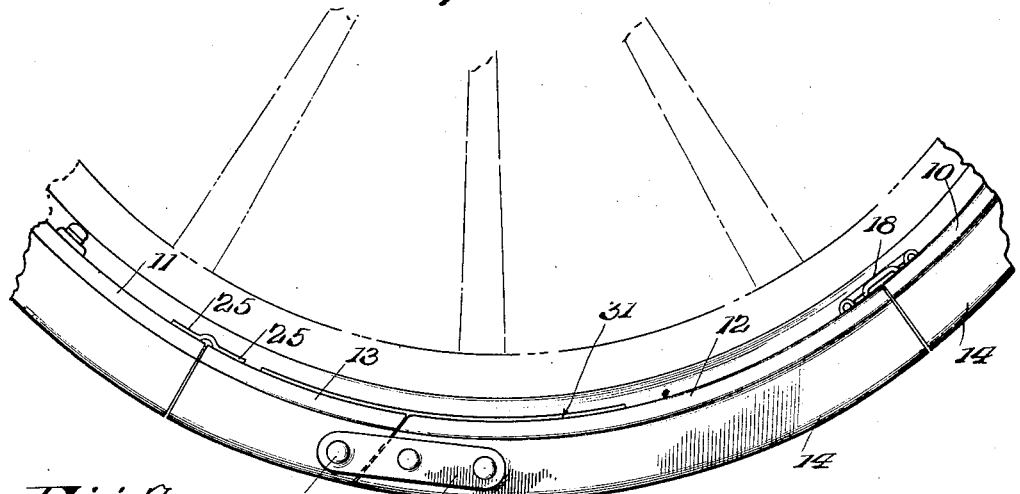
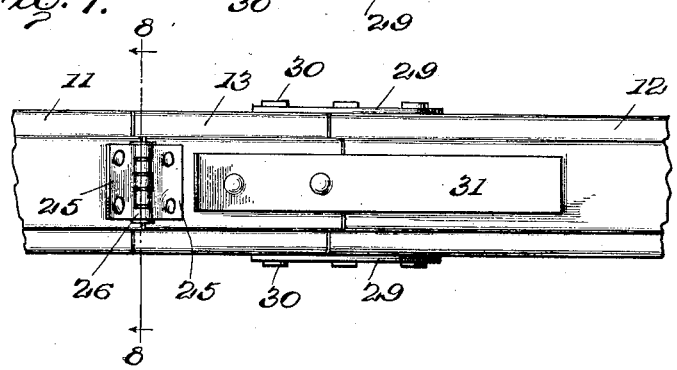
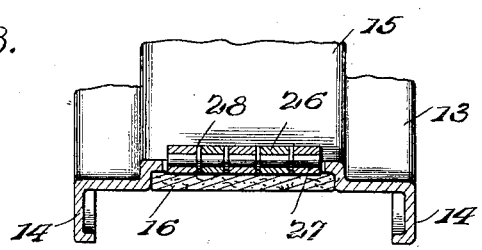
Inventor.
Ohmer H. Bartholomew.
by Lacey & Lacey, his Atty's

UNITED STATES PATENT OFFICE.

OHMER H. BARTHOLOMEW, OF PEORIA, ILLINOIS.

COLLAPSIBLE RIM.

1,372,794.     Specification of Letters Patent.    Patented Mar. 29, 1921.

Application filed November 12, 1919. Serial No. 337,384.

*To all whom it may concern:*

Be it known that I, OHMER H. BARTHOLOMEW, a citizen of the United States, residing at Peoria, in the county of Peoria and State of Illinois, have invented certain new and useful Improvements in Collapsible Rims, of which the following is a specification.

This invention relates to an improved collapsible wheel rim for motor vehicles and has as one of its principal objects to provide a rim which will rigidly support a tire thereon but wherein the tire may be placed upon or removed from the rim without difficulty.

The invention has as a further object to provide a rim employing hingedly connected pivoted rim sections movable inwardly for collapsing the rim and wherein said rim sections will provide a toggle operable for again expanding the rim.

And the invention has as a still further object to provide a hinge connection between certain of the rim sections of such nature that, when the rim is expanded, the pivot pins of said connections will be relieved of expansive as well as compressive strain upon the rim.

Other and incidental objects will appear hereinafter. In the drawings:

Figure 1 is a side elevation showing my improved rim collapsed,

Fig. 2 is a fragmentary perspective view showing the type of hinge connection employed between certain of the rim sections.

Fig. 3 is a transverse section taken on the line 3—3 of Fig. 2,

Fig. 4 is a fragmentary longitudinal section taken on the line 4—4 of Fig. 2,

Fig. 5 is a fragmentary side elevation of said hinge connection,

Fig. 6 is an enlarged fragmentary side elevation particularly illustrating the hinge connection between the toggle forming sections of the rim, Fig. 7 is a fragmentary plan view of the hinge connection between the toggle forming sections of the rim, and Fig. 8 is an enlarged transverse section on the line 8—8 of Fig. 7.

In carrying the invention into effect, I employ a rim body which is formed of coacting sections 10 and 11 respectively, and hingedly connected to these sections are rim sections 12 and 13. The several sections of the rim are, of course, designed to mate to form the complete rim and, as particularly illustrated in Fig. 3, the rim is of the clencher type, being provided with side flanges 14 preferably standing at substantially right angles to the rim base. Pressed inwardly from the rim base is an annular channel 15 and seating in said channel is a liner 16 which may be of canvas or other approved material, the liner being designed to prevent sticking of an inner tube to the base of the rim. The rim may, if desired, be formed with straight sides.

Connecting the sections 10 and 11 of the rim body is a hinge plate 17 and connecting the section 12 of the rim to the adjacent end of the section 10 is a similar plate 18. As particularly illustrated in Figs. 2 to 5 inclusive of the drawings, these plates are formed at their ends with bearings 19 freely received in suitable slots in the adjacent rim sections and extending through said bearings are pivot pins 20 the end portions of which are directed laterally through the base portions of said sections and are then headed or overturned to be secured thereto. The pivot pins are preferably of brass so as to eliminate rusting thereof and mounted upon said pivot pins at the ends of the bearings 19 are washers 21 which, for a similar reason are also preferably of brass. Thus, it will be seen that the plate 17 will connect the sections 10 and 11 of the rim body to freely swing upon each other while the plate 18 will support the section 12 for free swinging movement upon the section 10. At their side margins the hinge plates are slit longitudinally to define laterally extending wings 22 and the end portions of these wings are bent outwardly at substantially right angles to provide pairs of confronting radially directed lugs 23. Formed in the rim base adjacent the joint between the sections 10 and 11 as well as adjacent the joint between the sections 10 and 12, are pairs of openings 24 adapted to freely receive said lugs. Thus, when the sections 10, 11 and 12 are swung to conform to the annular contour of the rim, the lugs 23 will move to engage within said openings for rigidly connecting these sections of the rim and relieving the pivot pins 20 of either compressive or expansive strain upon the rim.

Secured to the inner face of the rim base at the confronting ends of the sections 11 and 13 of the rim are, as particularly shown in Fig. 7, hinge plates 25 provided with mating hinge lugs 26. Engaged through these hinge lugs is, as particularly shown in Fig.

8, a pivot pin 27. This pivot pin is preferably of brass so as to prevent rusting and interposed between adjacent lugs upon the pin are washers 28 also preferably of brass. The section 13 of the rim will thus be connected to the section 11 to freely swing thereon. Rigidly connected at corresponding end portions thereof to the side flanges of the section 12 of the rim are coupling plates 29 which may be riveted or otherwise secured to said flanges and pivotally connecting the adjacent end portion of the rim section 13 with the projecting end portions of said plates are pivot studs 30 freely engaging through the plates and the side flanges of the latter rim section. The meeting ends of the rim sections 12 and 13 are formed with mating beveled edges and riveted or otherwise secured against the inner face of the base portion of the rim section 13 is an operating arm 31. This arm is curved longitudinally to conform to the curvature of the rim and, at its free end portion is adapted to lie flat against the inner face of the base of the rim section 12, extending across the joint between the sections 12 and 13.

As will now be clear in view of the preceding description, a suitable tool may be inserted beneath the free end portion of the arm 31 and inward prying force exerted upon the arm for swinging the arm inwardly. Inward swinging of the arm will, of course, result in swinging the rim section 13 inwardly upon the section 11 when the several sections of the rim will move to the position illustrated in Fig. 1 for collapsing the rim. As will be appreciated, a tire may then be readily removed from or placed upon the rim. After a tire has been positioned about the rim, the operating arm 31 may then be grasped and the section 13 again swung outwardly for expanding the rim when the several sections of the rim will assume the position suggested in Fig. 6. In this connection it will be seen that the rim sections 12 and 13 will when the rim section 13 is thus swung inwardly, coact to form a toggle operable to expand the rim so that expansion of the rim may thus be effected with relative ease. When the rim is so expanded and is placed upon a wheel, as also suggested in this figure, it will be noted that the operating arm 31 will lie between the rim and the wheel felly so that the rim section 13 will accordingly be locked against accidental inward displacement. Collapsing of the rim will thus be prevented.

Having thus described the invention, what is claimed as new is:

1. A collapsible wheel rim including a split rim body, coacting pivotally connected rim sections normally completing the annular contour of the rim and movable inwardly for collapsing the rim, means pivotally connecting one of said sections to one end of the rim, a plate bridging the space between the other of said sections and the opposite end of the rim and hinged at its opposite ends to said section and the rim respectively, and means carried by said plate to engage through the rim base at opposite sides of the joint between the rim section and adjacent end of the rim body for holding the rim section against endwise movement relative to the rim body.

2. A collapsible wheel rim including a split rim body, coacting pivotally connected rim sections normally completing the annular contour of the rim and movable inwardly for collapsing the rim, means pivotally connecting one of said sections to one end of the rim, a plate bridging the joint between the other of said sections and the opposite end of the rim and hinged at its opposite ends to the latter section and the rim respectively, and lugs carried by said plate to engage through the rim base at opposite sides of the joint between the latter section and adjacent end of the rim body for holding the latter rim section against endwise movement relative to the rim body.

3. A collapsible wheel rim including a split rim body, coacting pivotally connected rim sections normally completing the annular contour of the rim and movable into position for collapsing the rim, means hingedly connecting one of said sections with one end of the rim body, a hinge plate, and pivot pins extending through said hinge plate and having their end portions directed outwardly through the rim base for securing the hinge plate to the other of the rim sections and the opposite end of the rim body and pivotally connecting the latter rim section with the rim body.

4. A collapsible wheel rim including a split rim body, coacting pivotally connected rim sections normally completing the annular contour of the rim and movable inwardly for collapsing the rim, means hingedly connecting one of said sections with one end of the rim body, and a hinge plate hingedly connecting the other of said sections with the opposite end of the rim body and provided with lateral wings having outstanding lugs engageable through the rim base at opposite sides of the joint between the latter rim section and adjacent end of the rim body for holding the latter rim section against endwise movement relative to the rim body.

5. A collapsible wheel rim including a sectional rim body, a hinge plate swingingly connecting the sections of the rim body and provided with means engageable through the rim base at opposite sides of the joint between said sections for holding the sections against endwise movement, coacting pivotally connected rim sections normally completing the annular contour of the rim and movable inwardly for collapsing the rim, means hingedly connecting one of the latter sections with one of the rim body sections, and a hinge plate swingingly connecting the other of the latter sections with the other of the rim body sections, said last mentioned plate being provided with means engageable through the rim base at opposite sides of the joint between the other of said last mentioned rim sections and the other of the rim body sections for holding the other of said last mentioned rim sections against endwise movement relative to the other of the rim body sections.

In testimony whereof I affix my signature.

OHMER H. BARTHOLOMEW. [L. S.]